Dec. 6, 1938.  A. G. F. KUROWSKI  2,139,552
TYPEWRITING MACHINE
Filed Oct. 19, 1935  6 Sheets-Sheet 1

Inventor:
Alfred G. F. Kurowski
BY B. C. Stickney
Attorney.

Dec. 6, 1938.  A. G. F. KUROWSKI  2,139,552
TYPEWRITING MACHINE
Filed Oct. 19, 1935   6 Sheets-Sheet 3

INVENTOR:
Alfred G.F. Kurowski
BY D.C. Stickney
ATTORNEY.

Dec. 6, 1938.   A. G. F. KUROWSKI   2,139,552
TYPEWRITING MACHINE
Filed Oct. 19, 1935   6 Sheets-Sheet 4

Dec. 6, 1938.  A. G. F. KUROWSKI  2,139,552
TYPEWRITING MACHINE
Filed Oct. 19, 1935  6 Sheets-Sheet 6

INVENTOR:
Alfred G F Kurowski
By D C Stickney
ATTORNEY.

Patented Dec. 6, 1938

2,139,552

UNITED STATES PATENT OFFICE 2,139,552

TYPEWRITING MACHINE

Alfred G. F. Kurowski, Brooklyn, N. Y., assignor to Underwood Elliott Fisher Company, New York, N. Y., a corporation of Delaware Application October 19, 1935, Serial No. 45,790

12 Claims. (Cl. 197—73)

This invention relates to a typewriter in which manual operation of the keys brings power mechanism into play to operate the typing and case-shift mechanisms by power, and deals particularly with the conversion of a hand-operated standard typewriter, such as the Underwood, exemplified in my Patent 1,248,346 dated November 27, 1917, and in the patent to Cook 1,222,736 dated April 17, 1917, into a power-operated typewriter.

An object of the invention is to provide a power mechanism which may be incorporated in such standard typewriter, to replace certain hand-operated connections, with a minimum of change to the standard machine.

A further object of the invention is to provide a power mechanism in which the electric motor and drive-train portions, outside of the typewriter, are compacted with reference to the latter so that the power-driven machine will not be excessively bulky.

Upon the shift to upper-case relative positions of the platen and types, a detent-device becomes effective to sustain said positions until the typing of the first upper-case character; such detent-device being employed herein in conjunction with means for shifting to upper case by power at operation of a regular shift key. A feature of the present improvements resides in novel provision whereby the shift to upper case has the effect of enabling the escapement universal bar or other suitable universally operated element of the escapement mechanism, as it co-operates in the typing of the first upper-case character, to disable or withdraw said detent-device for consequent restoration to lower-case relative positions of the platen and types. A corollary to said novel feature is that, during all primary or lower-case typing, said universal bar has no connection to said detent-devices, and idle movements of the latter by the universal bar are thereby avoided to the end, among other advantages, that the detent shall not be liable to miss its function through being rendered unready, by said universal bar, to catch and hold a shift to upper case.

A further feature of improvement resides in novel means whereby, for continuous or repeated typing in upper case, operation of a special shift key results in preventing the resulting case-shift from enabling the universal bar to disable said detent-device. A release-key train, additional to the regular and special shift-key trains, includes novel means whereby operation of a release-key is effective to cancel the result of operating either the regular shift key or the special shift key; said means including provision whereby, by operating the release-key, after operation of the regular shift key has caused a shift to upper case, restoration to lower case is effected independently of and before printing an upper-case character, and provision whereby, when the release-key is operated after said special shift key, the latter is released from a latch and the detent-device is tripped for terminating the condition of continuous upper-case typing.

The novel case-shift-controlling key-trains and detent-device may be correlated to the usual shift-rail-frame employed in the Underwood typewriter for case-shifting the platen frame, and said trains and devices are herein arranged for installation in substantially similar relation to the machine assembly as obtained for prior Underwood case-shift controls exemplified in said Cook Patent 1,222,736, thereby conducing to minimizing the alterations required to convert said prior machine into a power-operable machine.

A transverse power-shaft to which the types are selectively coupled by operation of typing keys is disposed within the typewriter-frame. For compacting the portion of the power-drive mechanism that is outside of the typewriter-frame, a compact, high-speed motor may be used and is attached to the back of the typewriter-frame, so that a drive-shaft from said motor extends along and is disposed close to the back of said frame. Transmission or reduction gearing is employed and may be placed, within a housing, in proximity to one of the corners formed by the back and side of the machine-frame, so that its input shaft is connected to said motor-drive shaft. Said transmission or reduction gearing may have an output shaft at right angles to said input and motor-drive shaft, said output shaft extending forwardly along the side of the typewriter-frame for connection to the power-shaft within said typewriter-frame. Such side-shaft may also have a gear or pulley to drive a carriage-return shaft disposed, in the Underwood machine, at the top of the typewriter-frame. Connection of said side-shaft to said type and case-shift actuating power-shaft is made by other transmission gearing contained in a housing attached to the side-member of the typewriter-frame. Said latter housing may also contain an adjustable jam-preventing friction coupling through which the side-shaft drives said power-shaft.

The portion of the power drive outside of the typewriter-frame being thus disposed partly along one side of the frame and partly along the back of said frame, the power drive and said frame are substantially compacted to the end that the power-driven typewriter with its power drive is practically no more bulky than the ordinary standard typewriter.

Other features and advantages will hereinafter appear.

In the accompanying drawings.

Type-bars 20 are swingable about a fulcrum 21 in a segment 22 to print by means of the usual upper and lower case types 23 against a platen 24, journaled in a platen-frame 25 which is case shiftable in a carriage 26. An external frame 29 of the typewriter has rails 30, 31 for said carriage.

At the end portion of the type-bar printing stroke, type-bar heel 32 moves the usual universal bar 33 and its frame 35 rearwardly to rock escapement dogs 34, said universal bar frame being supported and guided by the segment 22 as at 36, and by a rockable frame 38 pivotably supported at 39 by a fixture, not shown. At recoil of the type-bar 20, spring 41 restores the universal bar frame 35, the escapement-dogs 34 following. Escapement-wheel 42 coacts with the thus actuated escapement-dogs to letter-feed the carriage 26 by means of the usual feed-rack 47. The carriage is urged in letter-feed direction by the usual spring motor 40 represented by a fragmentary showing in Figure 2.

A rack 43 on the carriage meshes with a carriage return pinion 44, shiftable along a shaft 45 for connection and disconnection to and from a clutch-collar 46 keyed to said shaft which is journaled in a bracket 48. Said connection and disconnection, for starting and ending a carriage return operation, may be effected in a manner and by means set forth in my Patent 1,679,727, dated August 7, 1928.

The platen-frame 25 is supported and guided for up-and-down case-shifts by side arms 49 of a rock-shaft 50, journaled in the carriage 26, and by side links 57. A roller 51 and a hook 52 of said platen-frame 25 connect the latter to a shift-rail 53 embodied in a frame 54 having side members 55, 56 spacing said shift-rail 53 forwardly from a cross-shaft 58 of said frame journaled in the typewriter-frame 29 at 60, Figure 4. The lowercase position of the platen-frame is gaged by stops 61 on the carriage 26.

Figures 5, 6, 7:
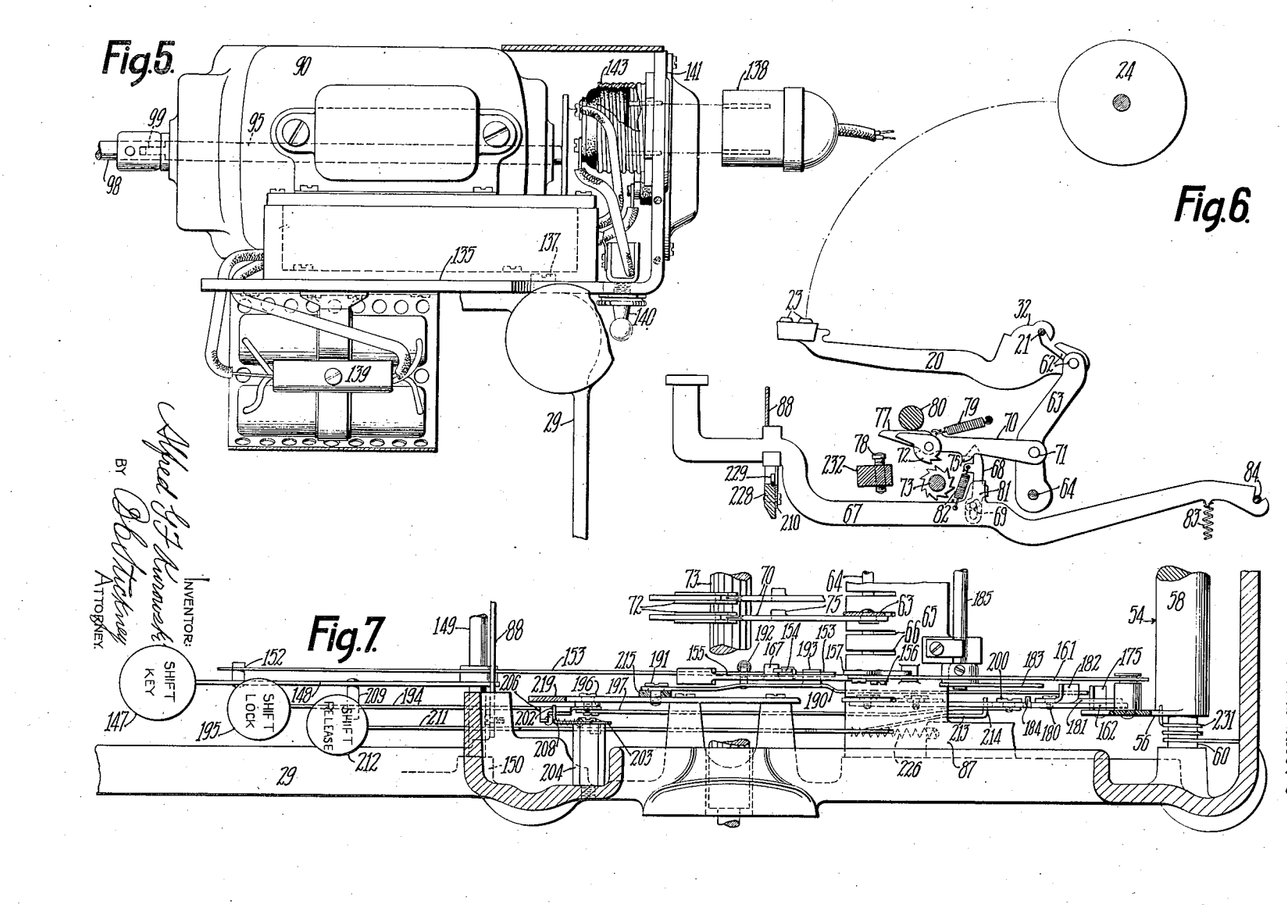
Figure 5 is an under side view of the electric motor, and shows the latter attached to the back of the typewriter-frame.
Figure 6 is a side view diagram representing the power-shaft and a type-action which may be coupled thereto at operation of the type-key lever.
Figure 7 is a top plan view of the part of the case-shift mechanism at one side of the typewriter-frame.

Each type-bar 20 has the usual pin-and-slot connection 62 to an operating lever 63 having a fulcrum 64 in a cross-bar 65 having lever-locating slots 66. A type-key-lever 67, Figure 6, when depressed, operates through a hook-link 68 pivoted thereto at 69, to draw downwardly a coupler-link 70, pivoted to the operating lever 63 at 71, and thereby causes a head 72 of said coupler-link to engage a rotating toothed power-shaft 73. The ensuing forward movement of the coupler-link 70 actuates the operating lever 63 and its type-bar 20 to print, a lug 75 of said coupler-link 70 meanwhile passing from the hook-link 68 of the type-key-lever 67. A cam 77 of the forwardly moving coupler-link 70 engages an adjustable stud 78 to effect disengagement of the coupler-link 70 from the power-shaft at a suitable time before the type 23 strikes the platen. At such disengagement, a spring 79 pulls the coupler-link 70 back against a stop 80, and, the coupler-link 70 having also passed from the hook-link 68, the type-bar 20 and operating lever 63 are free, after printing, to be returned to their normal Figure 6 positions by said spring 79. The usual type-bar rest (not shown) determines the normal position of the type-bar 20; and the normal position of the operating lever 63 may be determined by abutment of the coupler-link lug 75 with the hook-link 68, the latter, in turn, abutting a stop 81 on the key-lever 67. A spring 82 normally keeps the hook-link 68 against said key-lever stop 81 and will yield to permit the head of the hook-link 68 to pass the coupler-link lug 75 should the return of the key-lever 67 by its usual spring 83 follow restoration of the rest of the type-action parts.

The type-key-levers 67 have a fulcrum on a rod 84 in a cross-member 85 having key-lever locating slots 86, and forming part of a frame 87 including the cross-bar 65 for the operating levers 63, said frame 87 being attached to the typewriter-frame 29. A comb 88 attached to the typewriter-frame 29 guides the type-key-levers 67 at their forward portions.

The novel features of the motor-drive, outside of the typewriter-frame, for the power-shaft 73 will now be described.

Figures 1, 2:
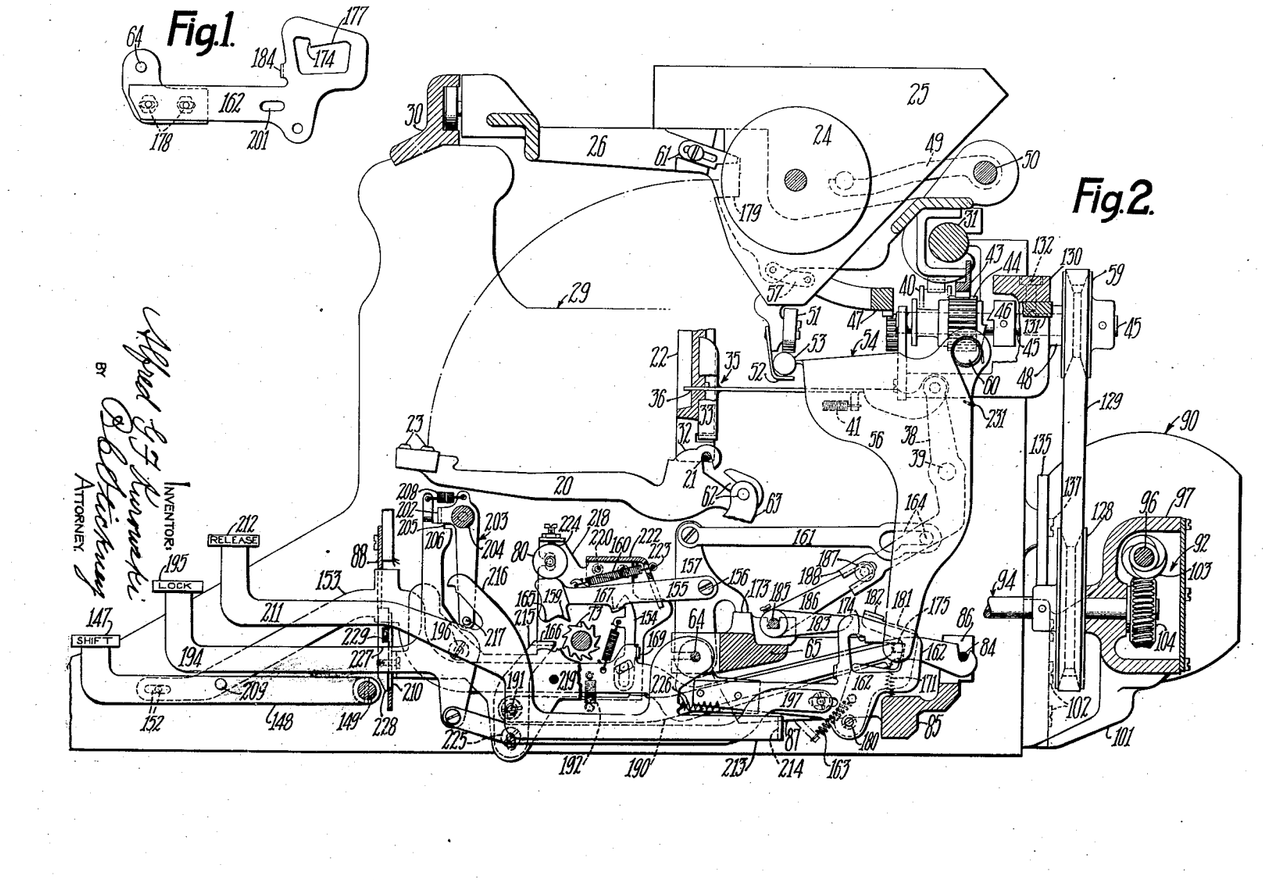
Figure 1 shows a detail of the case-shift mechanism.
Figure 2 is a sectional side view showing the invention embodied in a standard typewriter.
Figures 3, 4:
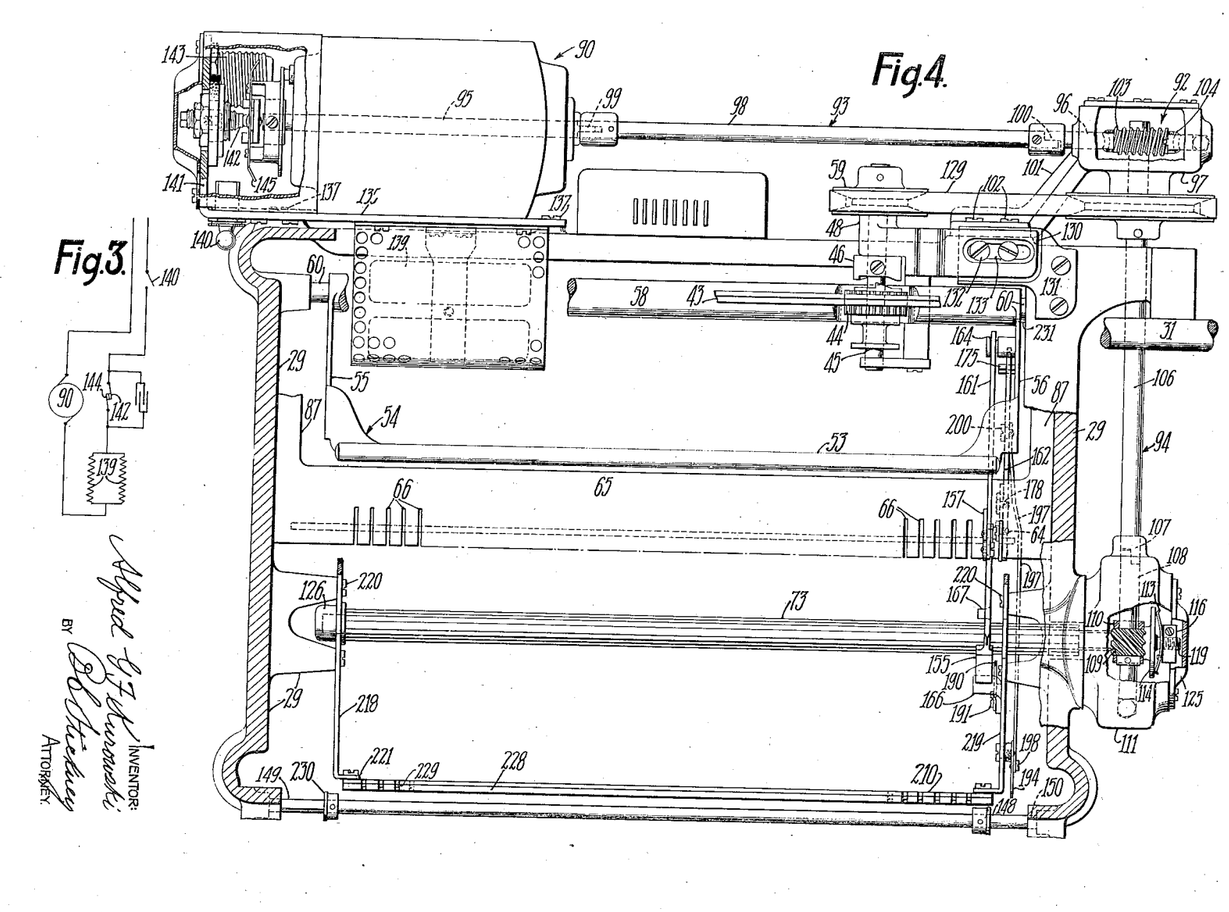
Figure 3 is a diagram of the electrical circuit which includes the motor, a circuit controller operated by the centrifugal governor, and a resistor.
Figure 4 is a top plan, partly sectioned, showing part of the case-shift mechanism, and the compact arrangement of the power mechanism with reference to the typewriter-frame.

Said power-shaft 73, within the typewriter-frame 29, is located relatively to the base and back of the machine, as in Figures 2 and 4. A compact electric motor 90, disposed adjacently to a back corner of the typewriter-frame 29, and a reduction-gearing unit 92, adjacent the other back corner of said typewriter-frame, are connected by a transverse shaft-line 93 which extends along and is close to the back of the machine. An output shaft-line 94 of the reduction-gearing unit 92 is at right angles to the transverse or motor shaft-line 93 and extends along and is close to the side of the typewriter-frame 29 for connection to the power-shaft 73.

The transverse motor-shaft line 93 includes a motor-shaft 95, an input shaft 96, of the reduction-gearing 92, journaled in a reduction-gearing housing 97, and a coupling shaft 98, detachably connected to said motor and input shafts, as at 99, 100, Figure 4. The reduction-gearing housing 97 has a bracket-arm 101, attached to the back of the typewriter-frame 29 by screws 102. A worm 103 on the reduction-gearing input shaft 96 drives the side shaft-line 94 at reduced speed through a worm-wheel 104, carried by a section 106 of said side shaft-line 94, said shaft-section 106 being journaled at one end in said reduction-gearing housing 97 and extending forwardly therefrom for detachable connection as at 107 to another shaft-section 108 which completes the side shaft-line 94 and carries a helical pinion 109 meshing with a helical gear 110 carried by the power-shaft 73. Said latter shaft-section 108 is journaled in a housing 111 which encloses the helical gearing 109, 110.

An adjustable friction coupling between the motor 90 and the power-shaft 73 is contained in the housing 111 and includes a resilient friction washer 113, keyed to the power-shaft 73, and a companion driving-disk 114 fastened to the helical gear 110. As the slip connection yields, said helical gear 110 rotates upon a reduced end portion 115, Figure 14, of the power-shaft 73. A power-shaft collar 116 has a pin 117 for driving the friction washer 113. The frictional grip of said driving-disk 114 on said washer 113 is adjusted by turning said collar 116 about a threaded end 119 of the power-shaft, and said collar may be split for securing it by a clamp-screw 120.

Figure 14:
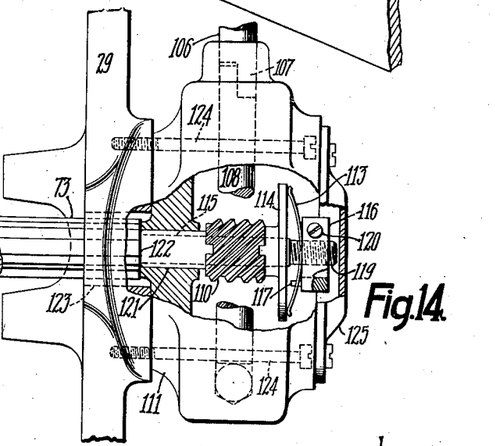
Figure 14 is a top plan view showing details of the gearing connecting the power-shaft and side-shaft.

The helical gear 110 has a sleeve 121 bearing against a shoulder 122 of the power-shaft 73, and, by means of said sleeve 121, the power-shaft may be journaled in the helical gear-housing 111, as seen in Figure 14, the side member of the typewriter-frame 29 having a clearance 123 for the power-shaft. Said housing 111 is secured to the typewriter-frame by screws 124, and has a removable side cover 125. The other end of the power-shaft is journaled in a bearing 126, Figure 4, in the typewriter-frame 29, and may be shouldered against said bearing, the other power-shaft shoulder 122 co-operating by bearing against the housing 111, Figure 14, to confine the power-shaft 73 endwise.

A pulley 128, carried by the side shaft-line 94, and a connecting belt 129 to a pulley 59 on the carriage-return shaft 45 connect the latter to the described power-drive which is thus enabled to return the typewriter-carriage. The carriage-return shaft-bracket 48 may have a laterally-extending arm 130, for attachment to a seat 131, provided upon the typewriter-frame 29, by screws 132 which pass through a slotted portion 133 of said bracket-arm, to provide for shifting said bracket 48 to adjust the belt tension.

It will be seen that the described three-sided power-drive array and the means employed therefor afford an important advantage, in that the power-drive is compacted relatively to the typewriter, so that the latter may be used with ordinary desk-facilities, and may be handled as readily as the ordinary standard typewriter; it being noted that the side shaft-line 94 and the rear motor-shaft-line 93 are respectively close to the frame of the machine. Furthermore, the three-sided power-drive array affords the advantage that the side shaft-line 94 thereof may be utilized as described for connecting the power-drive to the carriage-return shaft 45.

Figure 12:
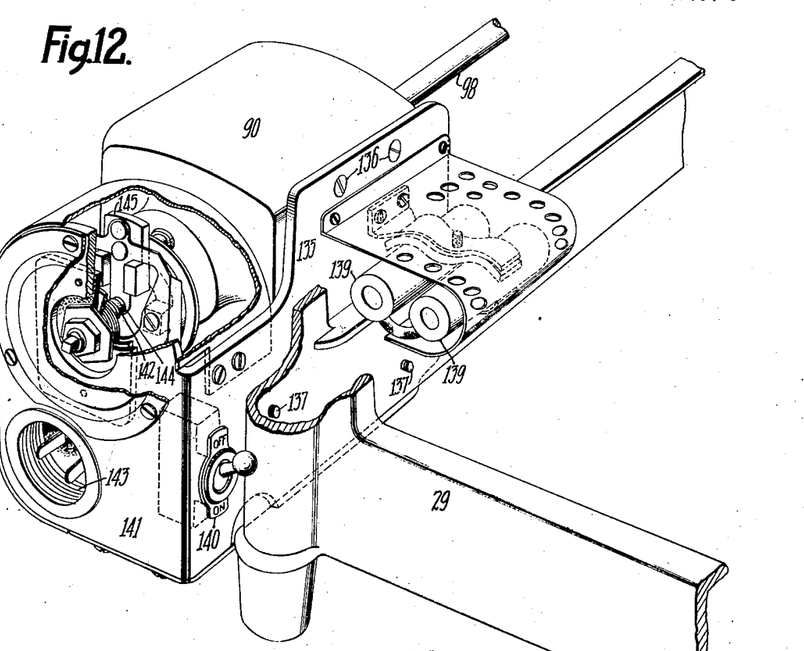
Figure 12 is a perspective view showing a corner of the machine frame and the compact motor attached thereto, parts of said motor being shown broken away to show details.
Figure 13:
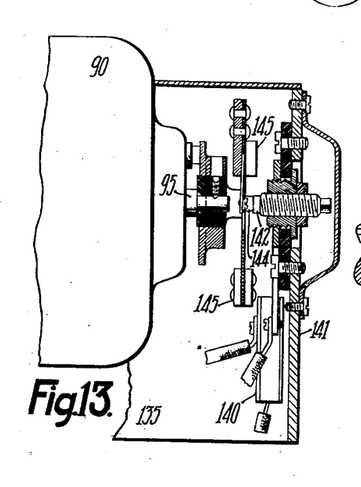
Figure 13 is a cross-section view of the centrifugal speed regulator as attached to and housed with the motor.

The electric motor 90 is shown attached, by screws 136, to a plate 135 attached to the back of the typewriter-frame by screws 137, Figures 2, 4 and 12. Said plate mounts a resistor 139 and a motor-switch 140, and is also bent to form a wall 141 which faces the outer end of the motor and mounts a contact 142, and a receptacle 143 for a power-line plug 138. Said contact 142 is at the axis of the motor 90 and faces a companion insulated contact 144 carried by the motor-shaft 95. A centrifugal controller 145 on the motor-shaft co-operates with said contacts 142, 144 to make and break the circuit, to regulate the speed of the motor according to adjustment of the contacts 142. For compactness a motor of high speed, say 10,000 R. P. M., may be employed. The resistor 139 co-operates with the centrifugal controller 145 and its contacts 142, 144 to reduce and maintain the speed of the motor-shaft-line 93 at say 2,400 R. P. M., and the reduction-gearing 92 provides for the desired speed of the side shaft-line 94, and the helical gearing 109, 110 may be proportioned for the desired speed of the power-shaft 73.

The novel case-shift mechanism includes a case-shift key 147 on a shift-key lever 148, keyed to a cross-shaft 149, journaled in the typewriter-frame 29 at 150, Figure 4. Depression of said shift-key lever 148 acts, through a pin-and-slot connection 152, to rock downwardly a main lever 153 extending rearwardly to the fulcrum 84 in the slotted cross-member 85, the latter and the front comb 88 retaining said main lever 153 laterally.

Said downwardly-rocked main lever 153 acts, through a hook-link 154, to swing downwardly a pull-link 155, pivoted at 156 to a case-shift-operating lever 157, and thereby connects said pull-link 155 at its head 159 to the rotating power-shaft 73. The ensuing power-shaft-driven forward movement of said pull-link 155 rocks said case-shift-operating lever 157 forwardly about the fulcrum-rod 64 to swing, by means of a link 161, the shift-rail frame 54 to the upper-case position, Figure 9.

Figures 8, 9:
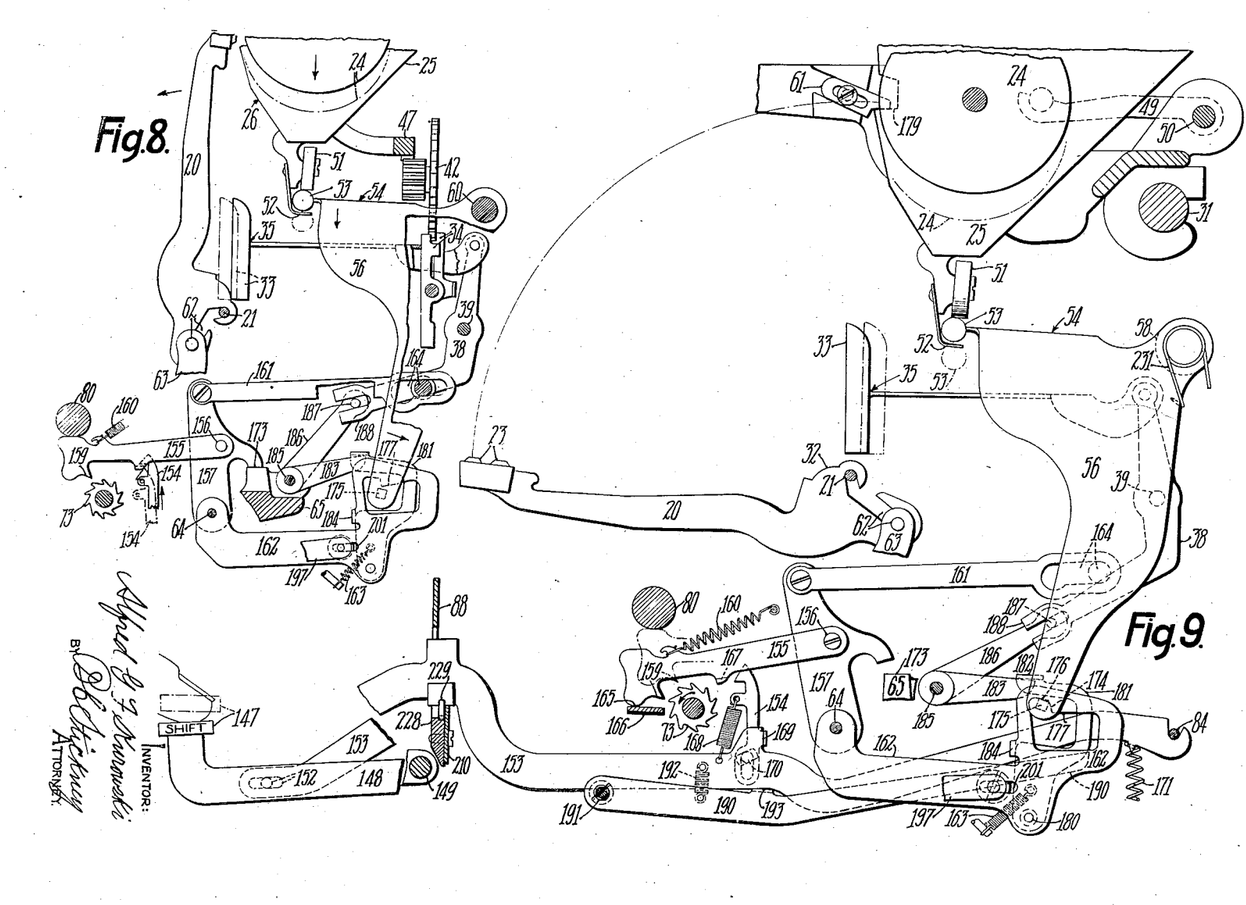
Figure 8 is a side view illustrating how the shift operation of the letter-feed universal bar controls the case-shift mechanism for restoration of the platen to lower-case position.
Figure 9 is a side view showing the power-operation of the case-shift mechanism, under the control of its shift-key, to raise the platen to upper-case position.

As said case-shift-rail frame 54 thus reaches said upper-case position, under the power-shaft impulse, a detent or latch arm 162, pressed by a spring 163, becomes effective to keep said shift-rail frame 54, together with the platen 24 and platen-frame 25, in upper-case position; the pull-link 155, the case-shift-operating lever 157 and the link 161, urged by a pull-link spring 160, returning to their normal positions independently of said frame 54, like in Figure 8, it being noted, however, that said Figure 8 represents a later phase in the operation of the case-shift mechanism. The link 161 has a pin-and-slot connection 164 to the case-shift-rail frame 54, to permit its return independently of the latter. The return of said link 161, the case-shift-operating lever 157 and the pull-link 155 results from the latter becoming disengaged from the power-shaft 73 when a nose 165 of said pull-link 155 encounters an abutment 166, which acts to disconnect the pull-link head 159 from the power-shaft 73. The disconnection of the pull-link 155 and power-shaft 73 may be effected before the shift-rail frame 54 finally reaches the upper-case position in that said frame 54 may finally reach said position by the inertia of the movement given it by the power-shaft impulse.

The pull-link 155 is free to return to its normal position independently also of return of the main lever 153, because a pull-link lug 167, engaged by the hook-link 154, will have passed from the latter. Said hook-link 154, pressed by a spring 168, stops against said main lever 153 at 169. Said spring 168 permits said hook-link 154, pivoted to said main lever 153, at 170, to pass said lug 167 at return of the main lever 153 by its spring 171. The pull-link 155 abuts the stop 80, while the case-shift-operating lever 157 abuts the cross-bar 65 at 173 in the normal positions of the parts, Figure 2.

A shoulder 174 of the latch-arm 162 drops, with the latter, behind a lateral projection 175 of the shift-rail frame side-member 56, to keep the shift-rail frame 54 in upper-case position, an edge 176 of said latch-arm 162 stopping at this time against the top of said projection 175, Figure 9. In the lower-case shift-rail-frame position, Figure 2, an edge 177 of said latch-arm 162 rests upon said projection 175. Said latch-arm 162 is pivoted to the fulcrum-rod 64 in the slotted cross-bar 65, which also locates said latch-arm laterally. Said latch-arm 162 is shown made in two parts having a screw and slot connection 178, Figure 1, for relative adjustment of said parts to adjust the position of the latching shoulder 174 in accord with the upper-case position of the shift-rail-frame 54. The platen-frame 25 has shoulders 179 for engaging the side-stops 61, Figure 9, to prevent overthrow of the shift to upper case.

The latch-arm 162 has pivoted thereto at 180 an arm 181 whose laterally projecting lug 182 is held retracted, at the lower-case position of the shift-rail frame 54, from a latch-arm-actuating releaser or finger 183, by abutment of said arm 181 against the lateral projection 175 of said shift-rail frame 54, the latch-arm spring 163 serving to urge said ram 181 toward said finger 183. As said shift-rail frame 54 is shifted from the lower-case, Figure 2 position, said arm 181 follows, until arrested by a stop 184 on the latch-arm 162, to bring its lug 182 over said finger 183, as in Figure 9, thereby operatively connecting said finger 183 to said latch-arm 162. Said finger 183 is keyed to a rock-shaft 185, journaled in the frame 87 and having an arm 186 connected at 187 to an arm 188 of the frame 38 of the universal-bar train. Thus, with said lug 182 over the finger 183, the operation of any type-action to print in upper case will, by means of the train from the universal bar to said finger 183, actuate the latter to lift the latch-arm 162 from the lateral projection 175 of the shift-rail frame 54, as in Figure 8. At the ensuing restoration of said shift-rail frame, together with the platen 24 and platen-frame 25, to lower-case positions by gravity, said lateral projection 175 encounters and swings the arm 181 back to its Figure 2 position, to retract the arm-lug 182 from the finger 183, to thereby avoid, during all lower-case typing, idle lifting of the latch-arm 162 to the Figure 7 position. Said latch-arm 162 is therefore never unready, during lower-case typing, to drop into upper-case-holding position, and it is therefore feasible, for fast operation of the machine, to shift to upper case substantially during the recoil of a type-action from lower-case printing.

An arm 190 extending rearward from a stationary pivot-screw 191 is swung upwardly by a spring 192 to confront the lateral projection 175 of the shift-rail frame 54 as the latter reaches its lower-case position, said arm 190 thus acting to prevent rebound of said frame 54 from said lower-case position. At the start of depression of the main lever 153, the latter, engaging a side lug 193 of said rebound-preventing arm 190, depresses the latter as in Figure 9, to permit the succeeding shift of the shift-rail frame 54 to upper-case position.

Figures 10, 11:
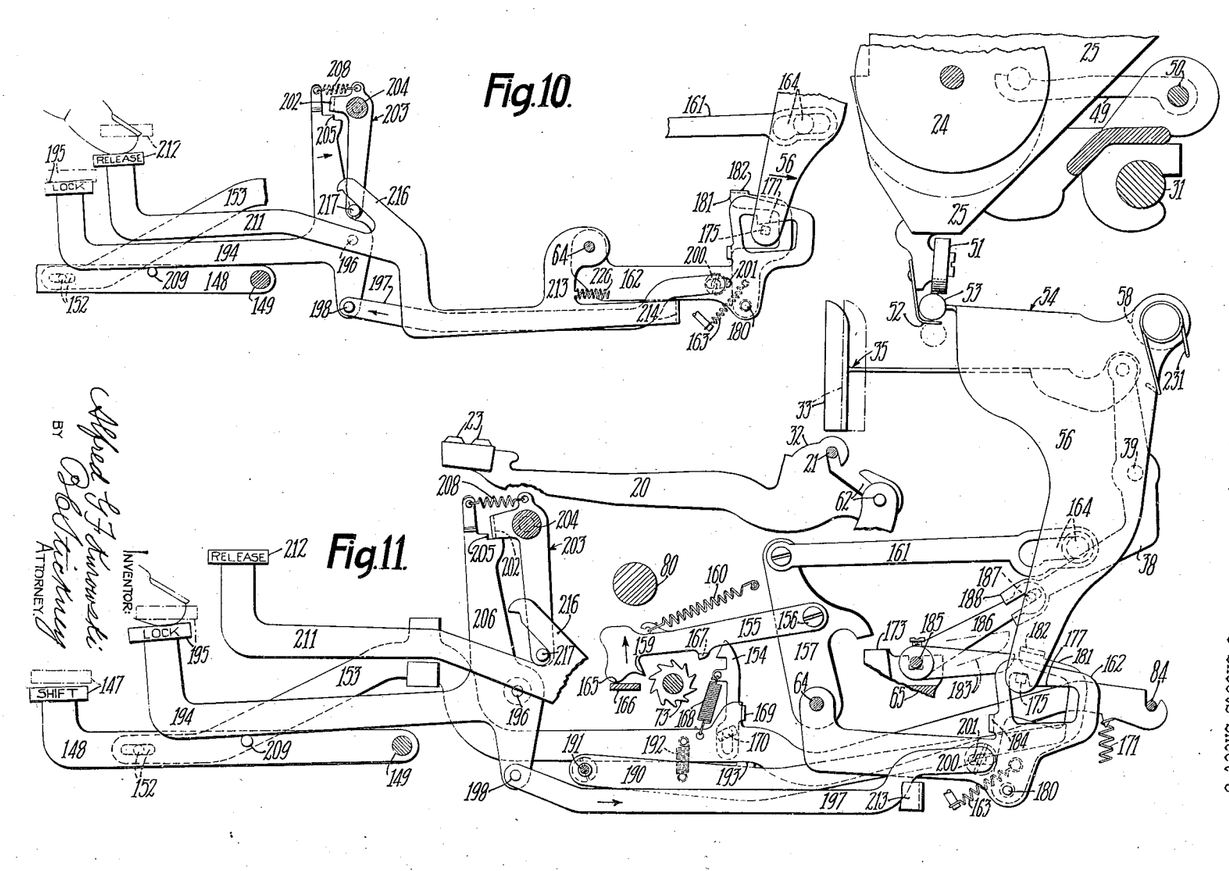
Figure 10 is a side view showing operation of parts of the case-shift mechanism in releasing the platen from upper-case position by manual operation of a release key.
Figure 11 is a side view showing power-operation of the case-shift mechanism at operation of a special shift key which also functions to disable the means whereby the letter-feeding universal bar effects restoration of the platen.

Preparatory to extended typing in upper case, a special key-lever 194, having a key 195, is depressed about a fulcrum-screw 196 to thrust a rod 197 rearwardly to oppose the arm 181, and thereby prevent forward swing of the latter when the shift-rail frame 54 moves to upper-case position. Said rod is pivoted at 198 to said special key-lever 194, and at its rear end is slidably supported for fore-and-aft movement by means of a headed stud 200 of said rod 197 working in a slot 201 of the latch-arm 162, the head of said stud opposing said arm 181 when said rod 197 has been thrust rearwardly by depression of special key-lever 194. An arm 202 of a latch-lever 203, having a fixed pivot at 204, drops behind a shoulder 205 of an arm 206 of the special key-lever 194, when the latter has been depressed as in Figure 11, to keep the rod 197 thrust rearwardly and the arm 181 away from the finger 183 until it is desired to end the typing in upper case. The special key-mechanism is thus operative to prevent the shift-rail-frame movement to upper-case position from enabling operation of any type-action at upper case to cause restoration of the shift-rail frame 54 and platen 24 to lower-case position. A common spring 208 serves to turn the latch-lever 203 into latching position, and also serves for restoring the special key-lever 194 upon the latter's release, which will be described presently. It will be seen that the rod 197 may turn about its pivot 198 in accordance with the lifting of the latch-arm 162 by the finger 183 or by a release-key mechanism which will be described presently.

The special key-lever 194 may be depressed, and become latched to thrust back and disable the arm 181, after a shift to upper case has been effected by operating the regular case-shift key 147; or the depression of said special key-lever 194 may initially effect the shift to upper-case position and become latched, besides disabling said arm 181. For these purposes, said special key-lever 194, when depressed, may also depress the regular shift-key lever 148 by engaging a pin 209 in the latter, as in Figure 11. The resulting depression of the main lever 153 by said regular shift-key lever 148 acts, as hereinbefore described, to connect the pull-link 155 to the power-shaft for effecting shift to upper case; the regular shift-key lever 148 and main lever 153 remaining depressed until the aforesaid release of said special key-lever, but the pull-link 155 returning, after its hereinbefore-described disconnection from the power-shaft 73, to the stop 80. It may be noted that, should the special key-lever 194 be depressed after the shift-rail frame 54 has been shifted to upper-case position and become held thereat, by the latch-arm 162, the main lever 153 will again be depressed and the pull-link 155 be connected to the power-shaft 73, but the resulting stroke of the operating lever 157 and link 161 will be idle.

A release lever 211, having a key 212, is depressed about the fulcrum-rod 64 in the slotted cross-bar 65, which laterally locates said release lever 211 which is also guided in a slotted cross-plate 210 which also guides the special key-lever 194. An arm 213 of said release lever 211 has a lateral extension 214 under the upper-case-holding latch-arm 162, whereby depression of said release lever 211 at its key 212, when the shift-rail frame 54 is held in upper-case position by said latch-arm 162, causes the latter to be lifted from the lateral projection 175 of the shift-rail frame 54, the latter thereupon returning to lower-case position.

Should the special key-lever 194 have been depressed and become held by the latch-lever 203, to disable the arm 181, preparatory to typing repeatedly in upper case, the depression of the release lever 211 will, besides lifting the latch-arm 162, as just described, turn said latch-lever 203, by engagement of a release-lever arm 216 with a latch-lever pin 217, to release said special key-lever 194, which ensuingly becomes restored by the spring 208. The restoration of the release lever 211 retracts the rod 197, to re-enable the arm 181 to couple said latch-arm 162 to the finger 183 if the next shift to upper case is effected by operating the regular shift-key lever 148.

Depression of the release lever 211 is thus effective to cause restoration of the shift-rail frame 54 from upper-case position, irrespective of whether the shift to upper case has been effected by means of the regular shift-key lever 148 alone, or in conjunction with operation of the special key-lever 194 to sustain the upper-case condition.

Side plates 218, 219 attached to the typewriter-frame 29 by screws 220 support the slotted cross-plate 210, as at 221, Figure 4, and also support a transverse angle bar 222, Figure 2, slotted to guide the type-action coupler-link 70 and the case-shift pull-link 155. The springs 79, 160 for said links 70, 155 are anchored, as at 223, to said angle bar 222. The stop 80 for said links 70, 155 is a transverse rod supported at its ends, for up-and-down adjustment, by said side plates 218, 219, as represented at 224, Figure 2. The left side plate 218 has the power-shaft bearing 126. The right side plate 219 has adjustably fastened thereto, by the pivot-screw 191 and a screw 225, a part 215 forming the pull-link controlling abutment 166, and also journals the special key-lever fulcrum-screw 196. A spring 226, reacting against the frame 87, Figure 7, restores the release-lever 211 to normal position against an edge of the comb 88. The special key-lever 194 is stopped, for its normal position, as at 227, by a transverse bar 228 attached to the cross-plate 210, and the main shift-lever 153 is similarly stopped by the comb 88.

229 represents a series of tumblers which act in known manner to permit full depression of only one key at a time; said tumblers being retained between said cross-plate 210 and transverse bar 228. The down strokes of the main lever 153, the special shift-key lever 194 and the release lever 211 are stopped by the bottoms of their respective slots in the cross-plate 210. The shift-key lever 148, fastened, at one side of the machine, to the cross-shaft 149, is supplemented by another shift-key lever 230 which is at the other side of the machine, and is partly shown in Figure 4, and is fastened to said cross-shaft 149. Manual depression of said other shift-key lever 230, instead of the shift-key lever 148, depresses the main shift lever 153, by means of said cross-shaft 149, the shift lever 148 and the pin-and-slot connection 152, and is thus operative like said shift-key lever 148 to effect a case shift. 231 represents a spring employed to partly counterbalance the weight of the platen 24, platen-frame 25 and shift-rail frame 54 and reacts at a suitable point against the typewriter-frame 29. The adjustable studs 78 controlling the type-action coupler-links 70 are threaded into a cross-bar 232 which may be supported by attachment to the side plates 218, 219.

Variations may be resorted to within the scope of the invention and portions of the improvements may be used without others.

Having thus described my invention, I claim:

1. In a typewriting machine having a platen and types, the combination of means shiftable to effect relative case shifts of said platen and types, a case-shift key, power-operated means callable into use by means of said key for shifting said shiftable means from a primary case position to another case position, a latch-device operative to hold said shiftable means in said other case position independently of said key and power-operated means, a universal bar coacting with said types, means associated with said latch-device and universal bar and controlled by said shiftable means whereby the shift of the latter to said other case position operatively connects said latch-device to said universal bar to enable the latter, at the actuation of a type following said shift, to trip said latch-device for ensuing restoration of said shiftable means to primary case position, and whereby said restoration disconnects said latch-device from said universal bar, a special case-shift key operable to call said power-operated means into play for case shifting said shiftable means as recited, and means settable by operation of said special key to disable the means controlled by said shiftable means and thereby prevent the latter, at the shift to said other case position, from enabling said universal bar to trip said latch-device, thereby to prevent the restoration of said shiftable means for the purpose of typing repeatedly in said other case.

2. In a typewriting machine having a platen and types, the combination of means shiftable to effect relative case shifts of said platen and types, a case-shift key, power-operated means callable into use by means of said key for shifting said shiftable means from a primary case position to another case position, a latch-device operative to hold said shiftable means in said other case position independently of said key and power-operated means, a universal bar coacting with said types, means associated with said latch-device and universal bar and controlled by said shiftable means whereby the shift of the latter to said other case position operatively connects said latch-device to said universal bar to enable the latter, at the actuation of a type following said shift, to trip said latch-device for ensuing restoration of said shiftable means to primary case position, and whereby said restoration disconnects said latch-device from said universal bar, a special case-shift key operable to call said power-operated means into play for case shifting said shiftable means as recited, means settable by operation of said special key to disable the means controlled by said shiftable means and thereby prevent the latter, at the shift to said other case position, from enabling said universal bar to trip said latch-device, thereby to prevent the restoration of said shiftable means for the purpose of typing repeatedly in said other case, and a release-key operable to trip said latch-device to restore said shiftable means to said primary case position, and to render said disabled means effective again preparatory to a case shift effected by means of the first-named shift-key.

3. The invention as set forth in claim 2, said release-key being operable to trip said latch-device for restoration, independently of said universal bar, of said shiftable means from case-shifted position effected by operation of said first-named shift-key.

4. In a typewriting machine having types, a platen, and a universal bar train coacting with said types, the combination of means shiftable to effect relative case shifts of said types and platen, power-operable means to shift said shiftable means from lower case to upper case position, a latch-device operable to hold said shiftable means in upper-case position independently of said power-operable means, said latch-device including provision whereby the shift of said shiftable means to upper case causes said latch device to become operatively connected to said universal bar train to enable the latter to trip said latch-device at the actuation of a type following said shift to upper case, and whereby, conversely, the restoration of said shiftable means to lower-case position resulting from the tripping of said latch-device causes the latter to become disconnected from said universal bar train, two case-shift keys, means whereby operation of either one of said keys activates said power-operable means, means associated with only one of said case-shift keys and becoming set at operation of said one key to render said provision inoperative and thereby prevent connection of said latch-device with said universal bar train, and a release key operable to unset said last-mentioned means and to coincidently trip said latch-device.

5. In a front-strike typewriting machine having a main frame, a platen, types, and a keyboard at the front of said main frame; a case-shift mechanism including, in combination with said platen, a shift-rail embodied in a frame swingable about an axis for moving said shift-rail up and down, a transverse power-shaft within said main frame, a key-operated lever extending rearwardly from said keyboard to a fulcrum provided within and near the corner formed by the back and base of said main frame, linkage connected to said shift-rail frame, said key-operated lever having means for engaging said linkage to connect the latter to said power-shaft for a resulting shift of said shift-rail frame to upper-case position, said linkage becoming disconnected from said power-shaft at the end of said shift, a latch-arm having a pivotal support forward of said lever fulcrum, said latch-arm interlocking with a lateral projection of a pendent arm of said shift-rail frame to hold the latter upon its shift to upper case, a device coacting universally with said types, and a spring-pressed lug on and shiftable relatively to said latch-arm under control of said pendent arm of the shift-rail frame, said lug responding to a shift of the shift-rail frame to upper-case position by moving into operative connections with said universal device, whereby said universal device is enabled to trip said latch-arm, at actuation of a type following said shift, for ensuing restoration of said shift-rail frame and platen to lower-case position, said shift-rail frame acting at its restoration to retract said lug from said universal device to render said latch-arm independent of said universal device at lower case.

6. The invention as set forth in claim 5, inclusive of a special key-lever extending from said keyboard to a fulcrum within said main frame and operatively connected to said first-mentioned lever for actuating the latter, said special key-lever having means whereby when depressed it opposes movement of said lug into operative connection with said universal device, and means for latching said special key-lever in depressed position.

7. The invention as set forth in claim 5, inclusive of a special key-lever extending from said keyboard to a fulcrum within said main frame and operatively connected to said first-mentioned lever for actuating the latter, said special key-lever having means whereby when depressed it opposes movement of said lug into operative connection with said universal device, means for latching said special key-lever in depressed position, and a release-key lever extending from said keyboard to a fulcrum and operative when depressed to release the latched special key-lever, and to trip said latch-arm for restoration of said shift-rail frame and platen to lower-case position.

8. In a power-case-shift mechanism for a typewriter, having types, type-keys and a platen, and having a letter-feed universal bar train, coacting with said type-keys, and means shiftable by power to effect relative case shifts of the types and platen, the combination of a latch-device operative to detain said shiftable means upon shift of the latter from a primary case position to another case position, said latch-device including provision whereby as a result of said shift of said shiftable means, said latch-device becomes operatively connected to said universal bar train to enable the latter to release said latch-device at the actuation of a type following said power-shift, restoration of said shiftable means to primary case position ensuing from the releasing of said latch-device effecting disconnection of said latch-device from said universal bar train, means settable to prevent connection of said latch-device to said universal bar train at the shift of said shiftable means from primary case position, and means operable at will to control the releasing of said latch-device and restoration of said shiftable means to normal position.

9. In a case-shift mechanism for a typewriter having types and a platen, the combination of a letter-feed universal-bar train coacting with said types, a power-operable driver, a self-returning case-shift key, means power-shiftable by said driver, upon manually effecting a case-shift stroke of said key, to effect a relative case-shift of said types and platen from a primary-case position to another case position, a latch-device automatically operative independently of said key to detain said shiftable means upon power-shifting of the latter to said other case position, whereby a momentary manually-executed case-shift stroke of said key suffices to effect the power case-shift and said key is free to return, and a connector-device operative, as a result of such power-shift of said shiftable means, to operatively connect said latch-device to said universal-bar train to enable the latter to trip said latch-device at the actuation of a type following said shift and whereby, conversely, restoration of said shiftable means to primary-case position ensuing from the tripping of said latch-device effects disconnection of said latch-device from said universal-bar train.

10. In a case-shift mechanism for a typewriter having types and a platen, the combination of a letter-feed universal-bar train coacting with said types, a power-operable driver, a self-returning case-shift key, means power-shiftable by said driver, upon manually effecting a case-shift stroke of said key, to effect a relative case-shift of said types and platen from a primary-case position to another case position, a latch-device automatically operative independntly of said key to detain said shiftable means upon power-shifting of the latter to said other case position, whereby a momentary manually-executed case-shift stroke of said key suffices to effect the power case-shift and said key is free to return, a connector-device operative, as a result of such power-shift of said shiftable means, to operatively connect said latch-device to said universal-bar train to enable the latter to trip said latch-device at the actuation of a type following said shift and whereby, conversely, restoration of said shiftable means to primary-case position ensuing from the tripping of said latch-device effects disconnection of said latch-device from said universal-bar train, and a lock adapted to engage normally said shiftable means and prevent rebound of the latter upon the restoration of the latter to primary-case position, said lock being operatively connected to said case-shift key so as to be rendered ineffective concomitantly with the momentary manual operation of said key and resulting power-shift of said shiftable means and so as to be rendered potentially effective, through the immediate release of the key, to re-engage said shiftable means upon the restoration of the latter.

11. In a case-shift mechanism for a typewriter having types and a platen, the combination of a letter-feed universal-bar train coacting with said types, means shiftable to effect a relative case-shift of said types and platen from a primary-case position to another case position, a latch-device automatically operative to detain said shiftable means in said other case position, a connector-device, operative as a result of such shift of said shiftable means, to operatively connect said latch-device to said universal-bar train to enable the latter to trip said latch-device in the actuation of a type following said shift, and whereby, conversely, restoration of said shiftable means to primary-case position ensuing from the tripping of said latch-device effects disconnection of said latch-device from said universal-bar train, a mechanism operable to act upon and shift said shiftable means from primary-case position, a shift-key 195 operable to actuate said latter mechanism, and means conditioned by operation of said shift-key 195, to prevent the connection of said latch-device to said universal-bar train at the shift of said shiftable means from primary-case position.

12. In a typewriting machine having a platen and types relatively shiftable, and having type-keys and a universal-bar train controlled by the type-keys, the combination of a releaser connected to said universal-bar train to vibrate idly at the type-key strokes, means shiftable to effect relative case-shifts of the platen and types, a case-shift key, power-operated means controlable by said case-shift key for effecting a shift of said shiftable means from primary-case position, a latch-device operative automatically to detent said shiftable means in its shifted position independently of said shift-key and of said power-operated means, means associated with said latch-device and said universal-bar train, and controlled by said shiftable means, for enabling the releaser at the actuation of a type-key following said shift, to trip said latch-device, for ensuing restoration of said shiftable means to primary-case position, a second shift-key 195 operable to control said power-operated means for effecting a case-shift, and means conditioned by operation of said shift-key 195 to prevent connection of said latch-device to said universal-bar train at the shift of said shiftable means from primary-case position.

ALFRED G. F. KUROWSKI.